US012627983B2

(12) United States Patent
Sharma et al.

(10) Patent No.: US 12,627,983 B2
(45) Date of Patent: May 12, 2026

(54) INTRUSION PREVENTION USING RECONFIGURATION MULTI-LINK ELEMENTS IN WIFI 7

(71) Applicant: Arista Networks, Inc., Santa Clara, CA (US)

(72) Inventors: Ashutosh Sharma, Nurpur (IN); Jatin Parekh, Mumbai (IN); Anubhav Gupta, Navi Mumbai (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/582,193

(22) Filed: Feb. 20, 2024

(65) Prior Publication Data

US 2025/0267459 A1 Aug. 21, 2025

(51) Int. Cl.
*H04W 12/122* (2021.01)
(52) U.S. Cl.
CPC ................................. *H04W 12/122* (2021.01)
(58) Field of Classification Search
CPC ............................................... H04W 12/122
USPC ........................................................... 726/23
See application file for complete search history.

(56) References Cited

U.S. PATENT DOCUMENTS

| | | | | |
|---|---|---|---|---|
| 8,560,705 | B2 * | 10/2013 | Larson | H04L 45/28 |
| | | | | 709/227 |
| 8,885,557 | B2 * | 11/2014 | Walke | H04W 12/03 |
| | | | | 713/153 |
| 10,863,358 | B2 * | 12/2020 | Shanmugavadivel | ...................... |
| | | | | H04W 72/04 |
| 11,374,965 | B2 * | 6/2022 | Sathe | H04L 63/1483 |
| 2006/0272014 | A1 * | 11/2006 | McRae | H04L 63/1416 |
| | | | | 726/12 |
| 2009/0016529 | A1 * | 1/2009 | Gopinath | H04W 12/069 |
| | | | | 380/270 |
| 2017/0063799 | A1 * | 3/2017 | Larson | H04L 61/5076 |
| 2020/0092725 | A1 * | 3/2020 | Shanmugavadivel | ...................... |
| | | | | H04W 72/04 |
| 2021/0014911 | A1 * | 1/2021 | Patil | H04L 1/1621 |
| 2023/0147311 | A1 * | 5/2023 | Fang | H04W 36/0038 |
| | | | | 370/331 |

OTHER PUBLICATIONS

"Wireless Intrusion Prevention Techniques", Retrieved from https://web.archive.org/web/20211206032552/https://wifihelp.arista.com/post/wireless-intrusion-prevention-techniques/, Dec. 6, 2021, pp. 4.

* cited by examiner

*Primary Examiner* — Amare F Tabor
(74) *Attorney, Agent, or Firm* — Tianyi He

(57) ABSTRACT

A communication link between an unauthorized AP MLD in a wireless network and a client device is terminated in response to spoofing a communication from the unauthorized AP MLD. The communication is sent from a device different than the unauthorized AP MLD to the client device and includes a source identifier that identifies the unauthorized AP MLD as a source device of the communication. The communication additionally or alternatively may contain or indicate a management or configuration element. The management or configuration element may include a reconfiguration multi-link element that specifies the first wireless communication link as no longer available.

17 Claims, 8 Drawing Sheets

200

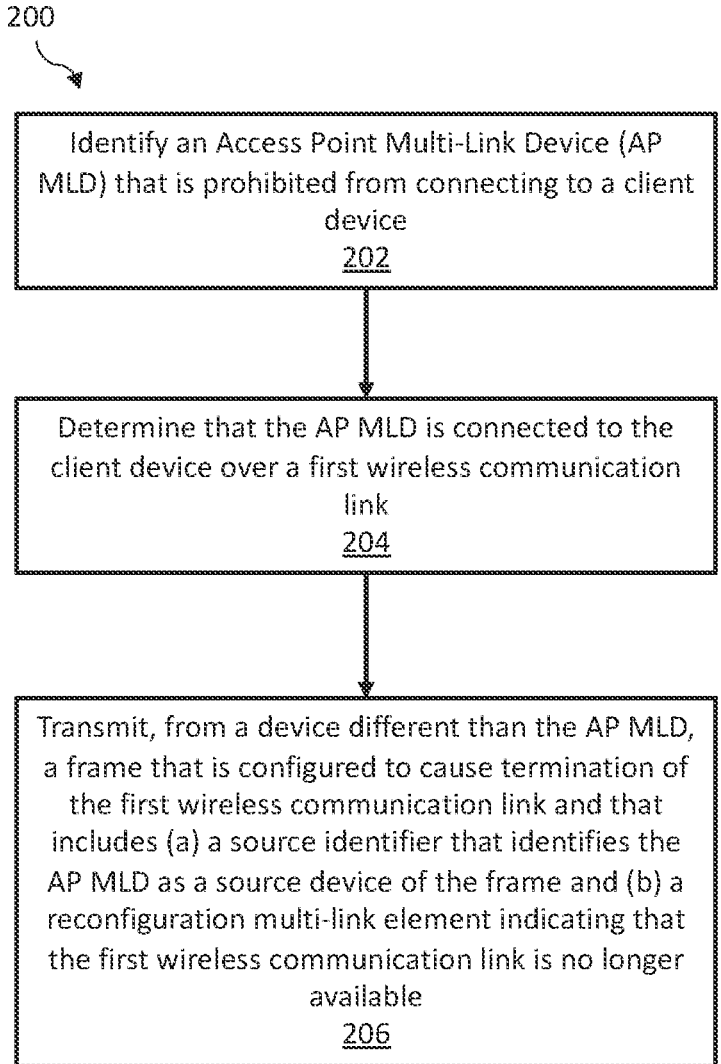

Identify an Access Point Multi-Link Device (AP MLD) that is prohibited from connecting to a client device
202

Determine that the AP MLD is connected to the client device over a first wireless communication link
204

Transmit, from a device different than the AP MLD, a frame that is configured to cause termination of the first wireless communication link and that includes (a) a source identifier that identifies the AP MLD as a source device of the frame and (b) a reconfiguration multi-link element indicating that the first wireless communication link is no longer available
206

FIG. 2

INTRUSION PREVENTION USING RECONFIGURATION MULTI-LINK ELEMENTS IN WIFI 7

TECHNICAL FIELD

The present disclosure relates to a computer-implemented technique for terminating a wireless communication link with an unauthorized device in a wireless network environment.

BACKGROUND

Within a wireless local area network (WLAN), a connection of a client device to an unauthorized or rogue access point (AP) can pose a significant threat to client security in particular and network security in general. For instance, establishing an illegitimate wireless fidelity (WiFi) hotspot within a wireless communications environment typically can be performed by nearly any user having basic computer skills. A bad actor with minimal computer programming and networking knowledge may set up an unauthorized hotspot, commonly known as a honeypot, within a wireless communications environment by utilizing a device including an off-the-shelf modem or router. Even a commonplace smartphone may hold the capability to function as a cost-free hotspot, e.g., honeypot, accomplishable by configuring specific parameters within the smartphone's general settings menu.

An unauthorized entity or bad actor may enable a Wifi hotspot, e.g., corresponding to a honeypot, within a WLAN to enable client devices to establish connections with the Internet. Typically, the honeypot may adopt the name of a legitimate establishment's WiFi network or a name that the client would naturally assume to be a permitted or preferred AP. For example, when a client device scans for an available AP (e.g., at a commercial establishment or in the vicinity of an enterprise) and encounters the name, the client may initiate a connection with the honeypot without suspicion. Once the client device connects, e.g., via an authentication process, a malevolent actor or unpermitted entity behind the connection or enabling the connection may be able to scrutinize and intercept the client's private information through sundry stratagems or surreptitious acts such as traffic filtering. As WLAN and wireless intrusion prevention system (WIPS) technologies advance and increase in complexity, challenges related to protecting users and client devices from connecting to unauthorized APs continue to grow and evolve commensurately.

The approaches described in this section are approaches that could be pursued, but not necessarily approaches that have been previously conceived or pursued. Therefore, unless otherwise indicated, it should not be assumed that any of the content or approaches described in this section qualify as prior art merely by virtue of their inclusion in this section.

BRIEF DESCRIPTION OF THE DRAWINGS

The embodiments of this disclosure are illustrated by way of example and not by way of limitation in the figures of the accompanying drawings. It should be noted that references to "an" or "one" embodiment of the disclosure in this disclosure are not necessarily to the same embodiment of the disclosure, and they mean at least one. In the drawings:

FIG. 2 shows an example set of operations for terminating a first wireless communication link between the client device and an unpermitted AP MLD in accordance with one or more embodiments of the disclosure;

DETAILED DESCRIPTION

Figure 1A:
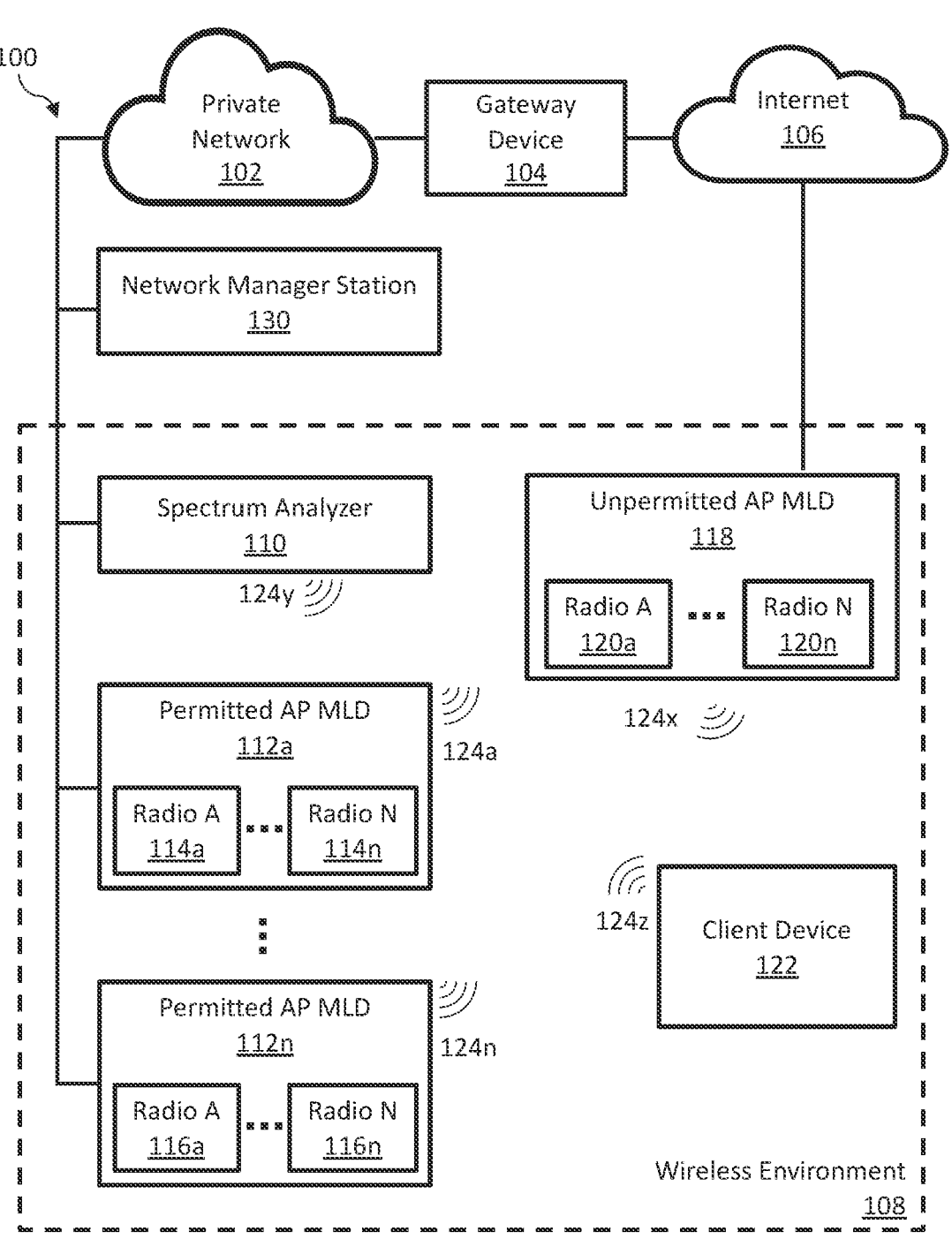
FIG. 1A illustrates an example computing system including multiple AP MLDs and a client device in a wireless environment and including a network manager station in accordance with one or more embodiments of the disclosure.

In the following description, for the purposes of explanation, numerous specific details are set forth in order to provide a thorough understanding of the disclosure. One or more embodiments of the disclosure may be practiced without these specific details. Features described in one embodiment of the disclosure may be combined with features described in a different embodiment of the disclosure. In some examples, well-known structures and devices are described with reference to a block diagram form in order to avoid unnecessarily obscuring the present invention.

1. GENERAL OVERVIEW
2. MULTI-LINK OPERATION (MLO) INTRUSION PREVENTION ARCHITECTURE
3. TERMINATING A LINK WITH AN ACCESS POINT MULTI-LINK DEVICE (AP MLD)
4. EXAMPLE EMBODIMENT
5. HARDWARE OVERVIEW
6. MISCELLANEOUS; EXTENSIONS

1. General Overview

One or more embodiments terminate a wireless communication link between a client device and an AP MLD by transmitting a frame, e.g., a management frame, that spoofs the frame-originator as the AP MLD. For instance, following a multi-link setup or association process, one or more communication links, e.g., channels, may be established between the client device and the AP MLD. A computing system may determine that a communication link between the client device and the AP MLD is prohibited. Based on or responsive to determining that the communication link is prohibited, the computing system may cause transmission from a device other than the AP MLD of a frame, e.g., management frame, that spoofs the frame-originator as the AP MLD by identifying the AP MLD as a source, e.g., transmitter, of the frame.

The management frame, as referred to herein, includes any type of frame with a reconfiguration multi-link element indicating that a communication link is no longer available. The reconfiguration multi-link element may indicate, for instance, that the wireless communication link is no longer available. In addition to identifying the frame-originator as the AP MLD, the frame, e.g., management frame, may identify the client device as a destination for or recipient of the frame. The client device receives and processes the management frame as if the management frame were transmitted by the AP MLD. As a consequence of the client device receiving the management frame and/or of the management frame containing the reconfiguration multi-link element (indicating that the communication link is no longer available), the client device terminates, e.g., initiates termination of, the communication link specified by the management frame.

One or more embodiments of the disclosure described in this Specification and/or recited in the claims may not be included in this General Overview section.

2. Multi-Link Operation (MLO) Intrusion Prevention Architecture

In general, according to an aspect or feature of the disclosure, one or more embodiments relate to a method that includes identifying, by one or more processors, an impermissible and/or prohibited wireless communication link between an AP MLD and a client device. In response to identifying the impermissible or prohibited wireless communication link between the AP MLD and the client device, a message or a frame may be accessed, generated, and/or created. The message or frame may include, for example, either or both of a source identifier and a management or configuration element. The management or configuration element may comprise, for example, a reconfiguration multi-link element indicating that the AP MLD is a source device of the frame and that the impermissible or prohibited wireless communication link is no longer available, respectively. The method may further include initiating, by the one or more processors, transmitting of the frame from a device different than the AP MLD. In one or embodiments, the transmitting of the frame causes the client device to initiate termination of the impermissible or prohibited wireless communication link.

According to another aspect or feature, one or more embodiments of the disclosure relate to one or more non-transitory media having instructions which, when executed by one or more processors, cause a group of operations. The operations in general may include identifying an AP MLD that is prohibited from connecting (or that is not authorized or permitted to connect) to a client device and determining that the AP MLD is connected to the client device over a first wireless communication link. The operations may further include, for example, responsive to determining that the AP MLD is connected to the client device over the first wireless communication link, spoofing a communication from the AP MLD by transmitting, from a device different than the AP MLD, a message or frame. The message or frame may contain or indicate a source identifier that identifies the AP MLD as a source device of the frame. The message or frame additionally or alternatively may contain or indicate a management or configuration element. The management or configuration element may comprise, for example, a reconfiguration multi-link element that specifies the first wireless communication link as no longer available. The client device may be caused to initiate termination of the first wireless communication link in response to receipt and processing by the client device of the frame.

Another aspect or feature of the disclosure relates in general to a computing system having one or more processors configured to facilitate determining that a certain AP MLD, prohibited from connecting (or not permitted to connect) to a client device, is connected to the client device over a first wireless communication link, followed by spoofing a communication of a signal or frame. The spoofed communication may include a source identifier indicating the AP MLD as an originator, source device, or sender of the frame. The signal or frame may in certain embodiments additionally include, for example, a reconfiguration message. The reconfiguration message may comprise, for example, a multi-link element indicating that the first wireless communication link is no longer available. In accordance with at least one aspect of the disclosure, the signal or frame is configured to cause the client device to facilitate, initiate, or instruct termination of the first wireless communication link. Once the frame has been received and processed by the client device, the client device according to one or more embodiments of the disclosure initiates and/or causes the termination of the first wireless communication link with the AP MLD.

Referring more particularly to the drawings, FIG. 1A illustrates an example computing system 100 including a private network 102, a gateway device 104, and a network connection to a network representative of at least a portion of the Internet 106. Any part or all of the private network 102, the gateway device 104, and the network representative of the Internet 106, e.g., the Internet, may take a variety of forms, be represented as multiple components, or be capable of communicating with any number of sources or components referenced herein. According to one or more embodiments of the disclosure, the computing system 100 of FIG. 1A may further include a wireless environment 108 and a network manager station 130. Any part of the wireless environment 108 or the network manager station 130 may take sundry forms and/or differing numbers of components according to certain embodiments of the disclosure. Any part of the wireless environment 108 or the network manager station 130 may be capable of communicating with various sources or components referenced herein and other sources or components.

The private network 102 according to embodiments of the disclosure may include, without limitation, one or more LANs, e.g., corresponding to an intranet. Such networking environments may be commonplace in enterprise computer networks and wireless communication environments. In exemplary implementations of the disclosure, such networks may comprise any of a variety of possible private, commercial, and/or enterprise networks.

The gateway device 104 and the Internet 106 may include connections, structures, and architectures according to known or corresponding systems and arrangements. The gateway device 104 and the Internet 106 may operate according to known protocols and corresponding known functions. Behind and/or protected by the gateway device 104 exists at least a portion of the private network 102 and/or at least a portion of the wireless environment 108 in certain embodiments.

Within the wireless environment 108 in accordance with embodiments of the disclosure, permitted AP MLDs 112a-112n and a client device 122 may communicate with each other. The permitted AP MLDs 112a-112n and the client device 122 may communicate within the wireless environment 108 via multiple radios included in each of the permitted AP MLDs 112a-112n and the client device 122 and/or via the private network 102. For instance, the permitted AP MLDs 112a-112n and the client device 122 may communicate wirelessly within the wireless environment 108, e.g., amongst one another, via Radio A 114a-Radio N 114n, Radio A 116a-Radio N 116n, and radio device(s) of the client device 122, respectively.

The wireless environment 108 according to certain embodiments of the disclosure includes or is related to each of a spectrum analyzer 110, multiple permitted AP MLDs such as or including the permitted AP MLDs 112a-112n, the unpermitted AP MLD 118, and the client device 122. One or more of the spectrum analyzer 110, the permitted AP MLDs 112a-112n, the unpermitted AP MLD 118, and the client device 122 may take a variety of configurations and/or components and communicate with various sources/components referenced herein or other sources/components. In typical embodiments, Radio A 114a-Radio N 114n may transmit and receive wireless communication signals 124a, Radio A 116a-Radio N 116n may transmit and receive wireless communication signals 124n, and Radio A 120a-Radio N 120n may transmit and receive wireless communication signals 124x within the wireless environment 108.

The spectrum analyzer 110 may be configured to detect and/or analyze electromagnetic signals, e.g., wireless electromagnetic energy and electromagnetic waves, corresponding to transmissions between or among wireless communication devices (e.g., radios of wireless communication devices such as Radio A 114a-Radio N 114n, Radio A 116a-Radio N 116n, radio device(s) of the client device 122, Radio A 120a-Radio N 120n) within the wireless environment 108. In one or more embodiments, the spectrum analyzer 110 is configured to detect and analyze spectrum-related information corresponding to communications, e.g., wireless communications, transmitted by wireless communication devices, e.g., any of the above-described radios, within the wireless environment 108.

Spectrum information generated by the spectrum analyzer 110 may be transmitted as analysis signals by the spectrum analyzer 110 to one or more other components or devices such as the network manager station 130. The network manager station 130, e.g., the connection detector 132 (FIG. 1B) of the network manager station 130, may in example implementations of the disclosure receive the analysis signals from the spectrum analyzer 110 and use/process the analysis signals to determine network metrics and detect events corresponding to the wireless environment 108. For instance, the network metrics and events may comprise or indicate a formation, presence, and/or use of a prohibited wireless communication link, e.g., between the unpermitted AP MLD 118 and the client device 122. Techniques and systems for detecting and analyzing electromagnetic signals, e.g., corresponding to wireless communication links, may be based on technologies or applications known or apparent from a reading of this description, including modifications or extensions thereof. For example, such technologies or applications may pertain to the fields of antennas and wireless communication transmissions.

The permitted AP MLDs 112a-112n and the unpermitted AP MLD 118 according to the illustrated embodiment may each include a plurality of radio antennae. As depicted in FIG. 1A, the plurality of radio antennae of permitted AP MLDs 112a-112n may each include respective electrical instruments, including for example Radio A 114a-Radio N 114n and Radio A 116a-Radio N 116n, while the plurality of radio antennae of unpermitted AP MLD 118 may include for example Radio A 120a-Radio N 120n. In accordance with certain embodiments described herein, a plurality of AP MLDs, e.g., the permitted AP MLD 112a and the permitted AP MLD 112n, are configured to support a plurality of multi-link enabled user or client devices in a multi-link enabled wireless communications environment, e.g., the wireless environment 108. For instance, at least one AP MLD such as the permitted AP MLD 112a in the wireless environment 108 may be configured to support multi-link transmissions to and from at least one multi-link enabled client device, e.g., the client device 122 over multiple wireless channels (links) in the wireless environment 108.

The client device 122 may comprise, according to certain embodiments, a user device such as a mobile wireless communication device configured to operate as a multi-link enabled component within a given WiFi 7 wireless communications environment, e.g., the wireless environment 108. For example, the client device 122 may comprise a tablet or smartphone configured to operate as a multi-link enabled computing device within a WiFi 7 wireless communications environment, e.g., the wireless environment 108. The client device 122 may be enabled to access multiple wireless links or channels, e.g., via at least a portion of the plurality of AP MLDs, at or near a same time in certain embodiments. For example, a multi-link operation (MLO) paradigm implemented within the wireless environment 108 may allow the client device 122 to connect to both a first link or channel, e.g., a 5-GHz wireless channel, and a second link or channel, e.g., a 6-GHz wireless channel. The first link or channel and the second link or channel may be offered, for example, by one or more of the plurality of AP MLDs for use, e.g., at the same time, by the client device 122 for wirelessly sending and receiving data.

In one or more embodiments, the computing system 100 may include or correspond to more or fewer components than the components illustrated in FIG. 1A. Additionally or alternatively, one or more client devices may be enabled via one or more of the plurality of AP MLDs to send and receive, e.g., simultaneously send and receive, data across different frequency bands and channels via the one or more of the plurality of AP MLDs to achieve performance enhancements as compared to non-MLO wireless environment paradigms. The performance enhancements may include, for example, one or more of increased throughput, reduced latency, or improved reliability as compared to non-MLO wireless communication paradigms or architectures. The increased throughput, reduced latency, or improved reliability may facilitate or enhance, for example, emerging computing applications such as virtual reality (VR), augmented reality (AR), online gaming, remote office communications, and cloud computing.

The one or more client devices enabled via one or more of the plurality of AP MLDs to send and receive data across different frequency bands and channels may in one or more embodiments each be structured similarly to the client device 122. For instance, the one or more client devices may be configured to send and receive the data on the frequency bands or channels simultaneously, near simultaneously, and/or pursuant to one or more send/receive orders, send/receive time intervals, or send/receive sequences. In certain embodiments of the disclosure, an alternating multi-link MLO paradigm may enable, for example, a client device such as the client device 122 to perform operations, e.g., sending and/or receiving data, via one or more of the plurality of AP MLDs, by alternating between two frequency bands and channels. For example, the operations may be performed by the client device 122 transmitting first and second portions of the data on first and second wireless channels or links, respectively, in an alternating fashion as compared to a simultaneous or tandem fashion.

Figure 1B:
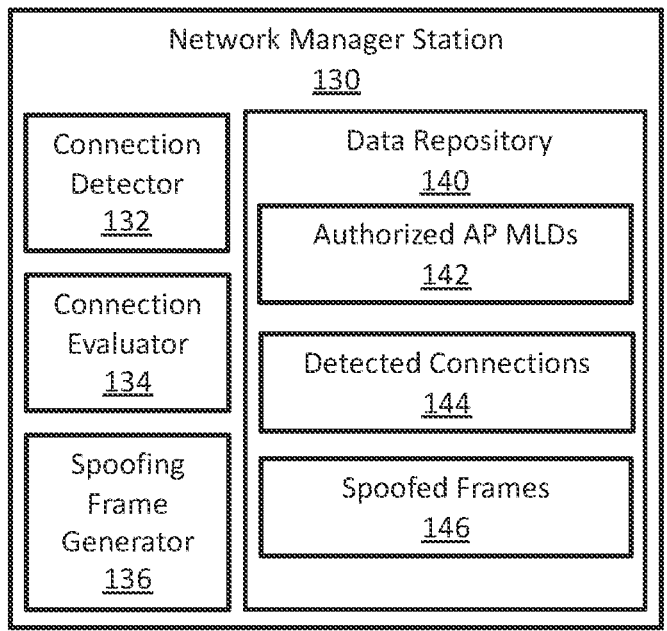
FIG. 1B depicts the network manager station in accordance with one or more embodiments of the disclosure.

The network manager station 130 according to embodiments may include components and contents as described and referenced in regard to FIG. 1B. The network manager station 130 may be arranged, for example, to facilitate operations corresponding to one or more of the operations described and referenced in relation to FIG. 2. In one or more embodiments of the disclosure, the network manager station 130 is configured to facilitate detection within the wireless environment 108 and termination within the wireless environment 108 of a wireless communication link between a user or client device and an unauthorized AP MLD. In accordance with certain implementations, the network manager station 130 is constructed and configured to determine that an unpermitted connection, e.g., wireless communication link within the wireless environment 108, exists between a client device and a non-authorized AP MLD and to cause termination of the unpermitted connection. For instance, the network manager station 130 may be configured to cause transmission, e.g., via the network manager station 130 and/or via a device such as the permitted AP MLD 112a, of a message that includes or references an instruction or indication that the recipient of the message, e.g., the client device 122, initiate termination of a prohibited wireless communication link between the client device 122 and the unpermitted AP MLD 118.

One of skill in the art will appreciate that the spectrum analyzer 110, the permitted AP MLDs 112a-112n, the unpermitted AP MLD 118, and the client device 122, and/or any portion(s) of the computing system 100 may be implemented as a cloud-based platform or may be distributed across multiple physical locations. The computing system 100 in some implementations may comprise an adaptive multi-agent operating system, an adaptive single agent system, or a non-agent system. The computing system 100 may include or operate with, in relation to, and corresponding to any of a distributed computing system, a distributed or centralized computing system, a virtual computing system, or any combination thereof.

FIG. 1B depicts elements and particulars regarding the network manager station 130 in accordance with one or more embodiments of the disclosure. As elucidated in the figure, the network manager station 130 may comprise one or more of a connection detector 132, a connection evaluator 134, and a spoofing frame generator 136. Certain elements and components illustrated in FIG. 1A and/or FIG. 1B may be local to or remote from each other. Various elements and components illustrated in FIG. 1A and/or FIG. 1B may be implemented in software and/or hardware. Each of one or more of the elements or components may be distributed over multiple applications and/or machines. Multiple elements or components may be combined into one application, element, component, and/or machine. Functions described with respect to one element or component may instead be performed by another element or component.

The connection detector 132 of the network manager station 130 may be configured to detect, for example, one or more connections, e.g., between one or more AP MLDs and/or one or more client devices corresponding to one or more wireless communication links. In certain embodiments of the disclosure, the connection detector 132 is configured to detect wireless connections and/or wireless communication links between AP MLDs and client devices within or corresponding to the wireless environment 108. According to some embodiments, the connection detector 132 is communicatively coupled to the spectrum analyzer 110 and is configured to detect a wireless connection, e.g., wireless communication link between the unpermitted AP MLD 118 and the client device 122, based on signals, e.g., the analysis signals, communicated with, e.g., received from, the spectrum analyzer 110. Techniques and systems for detecting connections, e.g., communication links between an AP MLD such as the unpermitted AP MLD 118 and a user device or client device such as the client device 122, may be based on technologies or applications known or apparent from a reading of this description, including modifications or extensions thereof. For example, such technologies or applications may pertain to fields and technologies relating to wireless intrusion prevention systems.

The connection evaluator 134 may be configured to evaluate, for example, signals and data relating to the spectrum analyzer 110 and/or the connection detector 132. In one or more embodiments, the connection evaluator 134 is configured to evaluate wireless connections and/or wireless communication links within the wireless environment 108. Evaluating a wireless connection or wireless communication links may comprise, for example, determining that a particular wireless connection or wireless communication link in the wireless environment 108 is active between two devices that are communicating in the wireless environment 108. In certain embodiments, evaluating a wireless connection or wireless communication link comprises, for instance, determining that a particular wireless connection or wireless communication link in the wireless environment 108 exists, is active, and/or is able to facilitate wireless communications between a client device 122 and an unpermitted AP MLD. According to example embodiments, the connection evaluator 134 is configured to evaluate one or more connections, e.g., communication links between one or more AP MLDs and one or more user or client devices. In one or more implementations, the connection evaluator 134 is configured to evaluate signal information (e.g., based on the spectrum information and/or the analysis signals) relating to, indicating, or describing wireless connections, e.g., wireless communication links within the wireless environment 108. Additionally or alternatively, the signal information, e.g., relating to, indicating, or describing wireless connections or wireless communication links, may correspond to, be evaluated by, be used by, or be generated by one or both of the spectrum analyzer 110 and/or the connection detector 132.

According to certain implementations, the connection evaluator 134 is communicatively coupled to the spectrum analyzer 110 and/or the connection detector 132. The connection evaluator 134 is configured to evaluate a wireless connection, e.g., wireless communication link between the unpermitted AP MLD 118 and the client device 122, based on signals communicated with, e.g., received from, the spectrum analyzer 110 and/or the connection detector 132. Techniques and systems for evaluating connections, e.g., wireless communication links between an AP MLD and a user/client device, may be implemented by or in connection with the connection evaluator 134 based on technologies or applications relating to the field of wireless intrusion prevention systems. Additionally or alternatively, techniques and systems implemented at the connection evaluator 134 for evaluating connections, e.g., communication links between an AP MLD such as the unpermitted AP MLD 118 and a user device or client device such as the client device 122, may be based on technologies or applications known or apparent from a reading of this description, including modifications or extensions thereof.

The spoofing frame generator 136 may in certain embodiments be configured to generate one or more spoofing frames, reconfiguration commands, and/or management instructions. Additionally or alternatively, the spoofing frame generator 136 may be configured to generate portion(s) of one or more spoofing frames and/or configured to generate frame information fashioned to facilitate creation and/or transmission of one or more spoofing frames. In one or more embodiments, the spoofing frame generator 136 is configured to generate one or more spoofing frames and/or portions of one or more spoofing frames based on, e.g., using, the spoofed frames 146 at the data repository 140. Additionally or alternatively, the spoofing frame generator 136 is configured to generate frame information configured to facilitate creation and/or transmission of one or more spoofing frames based on, e.g., using, the spoofed frames 146 at the data repository 140.

In one or more embodiments, the spoofing frame generator 136 is configured to generate one or more frames and/or packets that when transmitted to a client device cause the client device to initiate termination of an unauthorized wireless communication link between the client device and an unpermitted AP MLD. According to an aspect of the disclosure, the wireless communication link between the client device and the unpermitted AP MLD is indicated, e.g., specified, by at least one of the frames and/or packets. As described herein, the one or more frames or packets may include first information that identifies the frame-originator/sender as a device other than the originator/sender of the one or more frames or packets. As described herein, the one or more frames or packets may additionally or alternatively include second information that communicates, e.g., to the client device, that the wireless communication link between the client device and the unpermitted AP MLD is no longer available.

One of skill in the art will appreciate that the connection detector 132, the connection evaluator 134, the spoofing frame generator 136, and the network manager station 130 may take a variety of forms, be represented as multiple components, and communicate with any number of sources or components referenced herein and other sources or components. For example, the network manager station 130 may comprise one or more processors operable to receive instructions and process them accordingly, and may be embodied as a single computing device or multiple computing devices communicatively coupled to each other. The network manager station 130 may be implemented as a cloud-based platform or may be distributed across multiple physical locations. In an embodiment, processing actions performed by the network manager station 130 may be distributed among multiple locations.

In addition to comprising the connection detector 132, the connection evaluator 134, and the spoofing frame generator 136, the network manager station 130 in typical embodiments further comprises or is communicatively coupled, e.g., via a wired or wireless communication network, to a data repository 140. The data repository 140 in accordance with one or more embodiments of the disclosure is configured to store or access information including, indicating, or corresponding to one or more of authorized access points 142, detected connections 144, and spoofed frames 146. While illustrated within the network manager station 130, the connection detector 132, the connection evaluator 134, the spoofing frame generator 136, and/or the data repository 140 may be implemented within any other component within the computing system 100. In certain implementations, the connection detector 132, the connection evaluator 134, the spoofing frame generator 136, and/or the data repository 140 may be implemented at one or more of a device of the private network 102, the spectrum analyzer 110, and the permitted AP MLD 112*a*, or in some embodiments implemented at the unpermitted AP MLD 118.

As used herein, the authorized AP MLDs 142 may comprise or indicate, for example, a listing of network devices, e.g., operative with or relating to routers, switches, network devices, network address translators, or servers, configured to operate as permitted AP MLDs. Each identification or indication of a network device, e.g., authorized AP MLD, may correspond or relate, for example, to an address or name of the network device, Simple Network Management Protocol (SNMP) data, and/or other device or authentication details. In typical embodiments, the identified or indicated network devices may include one or more of the permitted AP MLDs 112*a*-112*n*. Additionally or alternatively, information stored at the data repository 140, e.g., may indicate or identify the unpermitted AP MLD 118 as not being one of the plurality of permitted AP MLDs indicated or identified by the authorized AP MLDs 142.

As used herein, the detected connections 144 may describe, comprise, or reference information indicating, for example, connections or links detected within the wireless environment 108. The detected connections 144 may correspond to or include information related to or created by the connection detector 132 and/or by the connection evaluator 134. In certain embodiments, the connections or links may be detected based on the signal information and/or may specify or indicate one or more connections, e.g., links between one or more AP MLDs and one or more client devices. The one or more connections or links may correspond to wireless connections or wireless communication links detected, analyzed, and/or evaluated by the connection detector 132 and/or by the connection evaluator 134. In one or more embodiments the detected connections 144 identify wireless connections or links detected between AP MLDs and client devices within or corresponding to the wireless environment 108.

As used herein, the spoofed frames 146 may include, for example, frames, multi-link elements, and/or packets as described, referenced, indicated by, or corresponding to the in-progress IEEE 802.11be specification and/or the Wi-Fi Alliance related or corresponding developments for WiFi 7 certification. Additionally or alternatively, the spoofed frames 146 may include or reference parts of the frames and/or packets. In particular examples, at least a portion of a management frame, e.g., a WiFi 7 management frame, is included or referenced in the spoofed frames 146. The management frame, as referred to herein, includes any type of frame with a reconfiguration multi-link element indicating that a communication link is no longer available. Additionally or alternatively, the spoofed frames 146 include or reference at least a portion of data of the management frame or at least a portion of data relating to the management frame. In one or more embodiments, the management frame may comprise a multi-link element, e.g., multi-link frame, comprising a plurality of fields that include a "multi-link control" field. The multi-link control field of the plurality of fields may comprise a plurality of subfields that include a "type" subfield. The type subfield of the plurality of subfields may include a value, e.g., 2, configured to indicate that the type is a reconfiguration type. According to an aspect of the disclosure, setting the type subfield to include the value 2 configures the multi-link element to operate as a reconfiguration multi-link element.

It is contemplated that the data repository 140 may store any information that can be stored in a computer-storage device or system, such as user-derived data, computer usable instructions, software applications, or other information. Information stored at the data repository 140 may be implemented across any of components, modules, or elements within the computing system 100. In the illustrated embodiment, for purposes of clarity and explanation, this information is shown and described as being stored or residing in relation to or with the data repository 140.

In some embodiments, the data repository 140 may cooperate (e.g., directly or via one or more network communication paths or communication links) with other modules or components, for example, to enable the disclosed aspects or in connection with performance of operations described herein. As used in this and the above paragraph, cooperation with or by the data depository 140 may include: retrieving data or enabling access to data, creating data or enabling creation of data, and writing data or enabling writing of data at or by the data depository 140. In certain embodiments, the data repository 140 is populated with information from a variety of sources and/or systems.

It is contemplated that the data repository 140 may store any information that can be stored in a computer-storage device or system, such as user-derived data, computer usable instructions, software applications, or other information. Information stored at the data repository 140 may be implemented across any of components, modules, or elements within the operating environment 108. In the illustrated embodiment, for purposes of clarity and explanation, this information is shown and described as being stored or residing in relation to or with the data repository 140.

3. Terminating a Link with an Access Point Multi-Link Device (AP MLD)

FIG. 2 shows an example set of operations for terminating a prohibited wireless communication link between a client device and an unpermitted AP MLD in accordance with embodiments of the disclosure. One or more operations illustrated in FIG. 2 may be modified, rearranged, or omitted altogether in certain aspects. Accordingly, the particular sequence of operations illustrated in FIG. 2 should not be construed as limiting the scope of one or more embodiments of the disclosure.

The operations may be performed at components within the computing system 100 to effectuate termination of a first wireless communication link between a client device and an unpermitted AP MLD in accordance with one or more embodiments of the disclosure. In certain embodiments of the disclosure, all or portions of one or more of the operations may correspond to, e.g., be performed by, hardware and/or software configured to perform the operations. For instance, a portion or all of the operations may be initiated by the network manager station 130 to effectuate termination of the first wireless communication link between the client device 122 and the unpermitted AP MLD 118 in accordance with certain embodiments of the disclosure. Additionally or alternatively, any part or all of the operations elucidated with reference to the figure may be performed, for example, by the network manager station 130 to cause termination of the first wireless communication link between the client device 122 and the unpermitted AP MLD 118.

At Operation 202, an AP MLD that is prohibited from connecting to a client device in a wireless environment is identified. Identifying an AP MLD that is prohibited from connecting to the client device in the wireless environment may comprise, for example, determining that the client is an authorized client of a specific network and determining that the AP MLD is not an authorized AP of that network, and thus, is not authorized to connect to the client device. According to an aspect of the disclosure, identifying that the AP MLD is prohibited from connecting to the client device in the wireless environment may comprise, for example, determining that the AP MLD is not permitted from connecting, e.g., linking, with the client device. Additionally or alternatively, the AP MLD may be identified as not being permitted to connect via the first wireless communication link to the client device. For example, the network manager station 130, and/or in particular one or more of the connection detector 132 of the network manager station 130 and the connection evaluator 134 of the network manager station 130, may detect the unpermitted AP MLD 118. For instance, the connection detector 132 and/or the connection evaluator 134 may detect the unpermitted AP MLD 118, e.g., based on wireless signals 124x emanating from or being sent to the unpermitted AP MLD 118. Based on detecting the unpermitted AP MLD 118, the network manager station 130 may determine that the unpermitted AP MLD 118 is prohibited from connecting to the client device 122. For instance, the connection evaluator 134 of the network manager station 130 may determine that the unpermitted AP MLD 118 is prohibited from connecting to the client device 122. Additionally or alternatively, determining that the unpermitted AP MLD 118 is prohibited from connecting to the client device 122 may be based on the authorized AP MLDs 142 at the data repository 140 and/or may be based on the information stored at the data repository 140 indicating or identifying the unpermitted AP MLD 118 as not being one of the plurality of permitted AP MLDs indicated or identified by the authorized AP MLDs 142.

At Operation 204, the unpermitted AP MLD is determined to be connected to the client device over the first wireless communication link. For instance, following a multi-link setup or association process, one or more communication links, e.g., channels, may be established between the client device and the unpermitted AP MLD. A system component, e.g., the network manager station 130, may determine that a communication link, e.g., the first wireless communication link, between the client device and the unpermitted AP MLD is impermissible. For example, the network manager station 130, and/or in particular the connection evaluator 134 of the network manager station 130, may determine that the unpermitted AP MLD 118 is connected to the client device 122 through the first wireless communication link. Determining that the unpermitted AP MLD 118 is connected to the client device 122 via the first wireless communication link may be based on detecting and analyzing one or both of the wireless signals 124x emanating from or being sent to the unpermitted AP MLD 118 and the wireless signals 124z emanating from or being sent to the client device.

Based on or in response to determining that the communication link is impermissible, the network manager station 130 may cause transmission from a device different than the unpermitted AP MLD 118 of a frame. The frame may include information of or corresponding to any of the content stored with or referenced by the spoofing frames 146 and/or the spoofing frame generator 136. In certain embodiments of the disclosure, the frame may operate as or comprise a management frame. In certain embodiments, the frame is fashioned to indicate or comprise information that is configured to or that operates to spoof the frame-originator as the AP MLD. In one or more implementations, the frame when received and processed by the client device spoofs the frame-originator as the AP MLD by identifying the AP MLD as a source of the frame. In an implementation, the frame spoofs the frame-originator as the AP MLD by identifying the AP MLD as the sender, e.g., transmitter, of the frame.

At Operation 206, a frame is caused to be transmitted to the client device in order to cause, e.g., instruct, the client device to terminate the first wireless communication link between the client device and the unpermitted AP MLD 118. For instance, the frame may be caused by the network manager station 130 to be sent via a beacon transmission protocol or by way of a probe response transmission protocol. Additionally or alternatively, the frame may be caused to be sent by an AP MLD such as the permitted AP MLD 112a by way of a beacon transmission or by way of a probe response transmission. In certain embodiments of the disclosure, an AP MLD such as the permitted AP MLD 112a may broadcast and/or send at least one probe response, e.g., responsive to one or more particular events, for receipt and use by the client device 122. For instance, the one or more particular events may comprise a probe request or other type of request from a device such as the client device 122. In an embodiment, the probe response may comprise a unicast message.

The frame caused to be transmitted to the client device may be configured to cause termination of the first wireless communication link between the client device and the unpermitted AP MLD. In certain embodiments, the frame caused to be transmitted to the client device is configured to instruct the client device to terminate the first wireless communication link between the client device and the unpermitted AP MLD. The frame may comprise, for instance, a management frame, e.g., similar to or corresponding to a management frame or element described or referenced by IEEE 802.11be and/or WiFi 7 specifications, documents, or information.

In accordance with one or more embodiments, the management frame may include first information that identifies the frame-originator as an entity other than the originator and/or other than a sender of the management frame. In an aspect of the disclosure, the first information may comprise a source identifier that identifies the unpermitted AP MLD device as a source device of the management frame. In typical embodiments, the management frame is transmitted to the client device from a device other than, e.g., different from, the unpermitted AP MLD yet identifies the frame-originator as the unpermitted AP MLD. For example, the management frame may be transmitted to the client device 122 from the permitted AP MLD 112a and may identify the unpermitted AP MLD 118 as the originator or sender of the management frame. By identifying the frame-originator as an entity other than the frame-originator (e.g., different than the permitted AP MLD 112a), the management frame may operate to spoof the identity of the frame-originator as the unpermitted AP MLD 118.

In accordance with an additional or alternative aspect of the disclosure, the management frame may include second information that is operative to communicate or specify, e.g., to the client device, that the first wireless communication link between the client device and the AP MLD is no longer available. According to one or more embodiments of the disclosure, the second information may indicate to the client device 122 that the first wireless communication link between the client device 122 and the unpermitted AP MLD 118 is no longer available. According to a particular aspect of the disclosure, the second information may comprise a reconfiguration multi-link element specifying that the first wireless communication link between a client device receiving the second information and an unpermitted AP MLD related to the first wireless communication link is no longer available.

In addition to identifying the frame-originator as the unpermitted AP MLD, the management frame may identify the client device as a destination for the frame. The client device receives and processes the management frame as if the management frame were transmitted by the unpermitted AP MLD. As a consequence of the client device receiving the management frame and of the management frame containing the reconfiguration multi-link element (indicating that the communication link is no longer available), the client device terminates the communication link specified by the management frame.

In certain embodiments, the first wireless communication link is one of a plurality of wireless communication links corresponding to the unpermitted AP MLD. The reconfiguration multi-link element may indicate that a second wireless communication link, which connects the unpermitted AP MLD and the client device, is no longer available. Additionally or alternatively, when the first wireless communication link is one of a plurality of wireless communication links established between the client device and the AP MLD, the frame may indicate that each of the plurality of wireless communication links are no longer available. Additionally or alternatively, the client device may terminate each of the plurality of wireless communication links in response to receiving the frame.

In one or more additional or alternative implementations, the frame may include an unencrypted frame and/or an unencrypted probe response frame. Transmitting the unencrypted frame or the unencrypted probe response frame may cause the client device to terminate the prohibited wireless communication link. In additional or alternative embodiments, the frame may include one or both of an unencrypted frame and an unencrypted beacon frame. The transmission of the unencrypted frame or the unencrypted beacon frame may cause the client device to terminate the prohibited wireless communication link.

4. Example Embodiment

A detailed example is described below for purposes of clarity. Components and/or operations described below should be understood as specific examples which may not be applicable to certain embodiments. Accordingly, components and/or operations described below should not be construed as limiting the scope of any of the claims.

FIGS. 3A-3D depict an example implementation of terminating a first wireless communication link between a client device and an unpermitted AP MLD in accordance with one or more embodiments of the disclosure. Like elements in the figures, e.g., with respect to FIGS. 1A-1B and FIGS. 3A-3D, are referred to with and using like reference numeral indicators. FIGS. 3A-3D illustrate a particular computing system and sequence of operations for terminating a first wireless communication link by transmitting a spoof management frame. The example implementation depicts a wireless environment 300 that includes or corresponds to a first enterprise wireless communication network and a second enterprise wireless communication network.

The first enterprise wireless communication network may correspond to a first commercial entity, e.g., Coffee Shop 350. The first commercial entity, e.g., Coffee Shop 350, may comprise the unpermitted AP MLD 318. In the illustrated example, the unpermitted AP MLD 318 may comprise a corresponding set of radios including a Radio A 320a and a Radio N 320n. The Radio A 320a and the Radio N 320n may transmit and receive wireless communication signals 324x.

The second enterprise wireless communication network may correspond to a second commercial entity, e.g., Scranton Paper Company 360. The second commercial entity, e.g., Scranton Paper Company 360, may comprise multiple AP MLDs such as the permitted AP MLD 312a and a permitted AP MLD 312n. Further, the permitted AP MLD 312a and the permitted AP MLD 312n may comprise a first set of radios including a Radio A 314a and a Radio N 314n and a second set of radios including a Radio A 316a and a Radio N 316n, respectively. For example, the Radio A 314a and the Radio N 314n may transmit and receive wireless communication signals 324a, and the Radio A 316a and the Radio N 316n may transmit and receive wireless communication signals 324n.

Further, the second commercial entity, e.g., Scranton Paper Company 360, in the illustrated implementation may comprise a spectrum analyzer 310 and a network manager station 330. According to one or more embodiments, the wireless environment 300 comprises a WiFi 7 wireless communications environment, cf., the wireless environment 108, supporting one or more multi-link enabled client devices, such as one or more tablets or smartphones. The one or more client devices are enabled to access multiple wireless links or channels, e.g., via at least a portion of the plurality of AP MLDs, at or near a same time. For example, an MLO paradigm implemented within the wireless environment 360 may allow a client device 322 to connect to both a first link or channel, e.g., a 5-GHz wireless channel, and a second link or channel, e.g., a 6-GHz wireless channel. The first link or channel and the second link or channel may be offered, for example, by one or more of the plurality of AP MLDs for use, e.g., concurrently, by the client device 322 for wirelessly sending and receiving data.

Figure 3A:
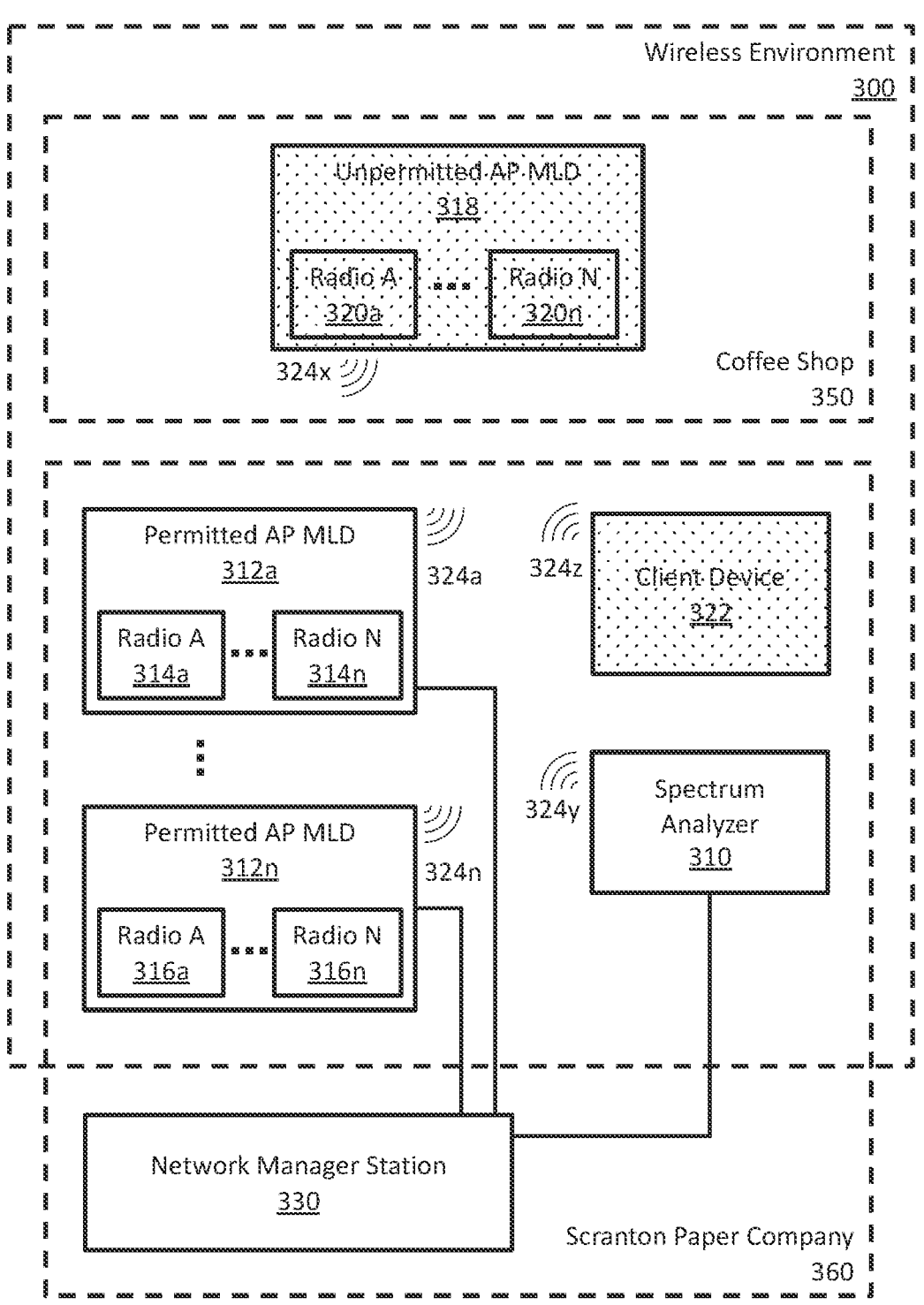
FIGS. 3A-3D depict an example implementation of terminating a prohibited wireless communication link between a client device and an unpermitted AP MLD in accordance with one or more embodiments of the disclosure.
Figure 3B:
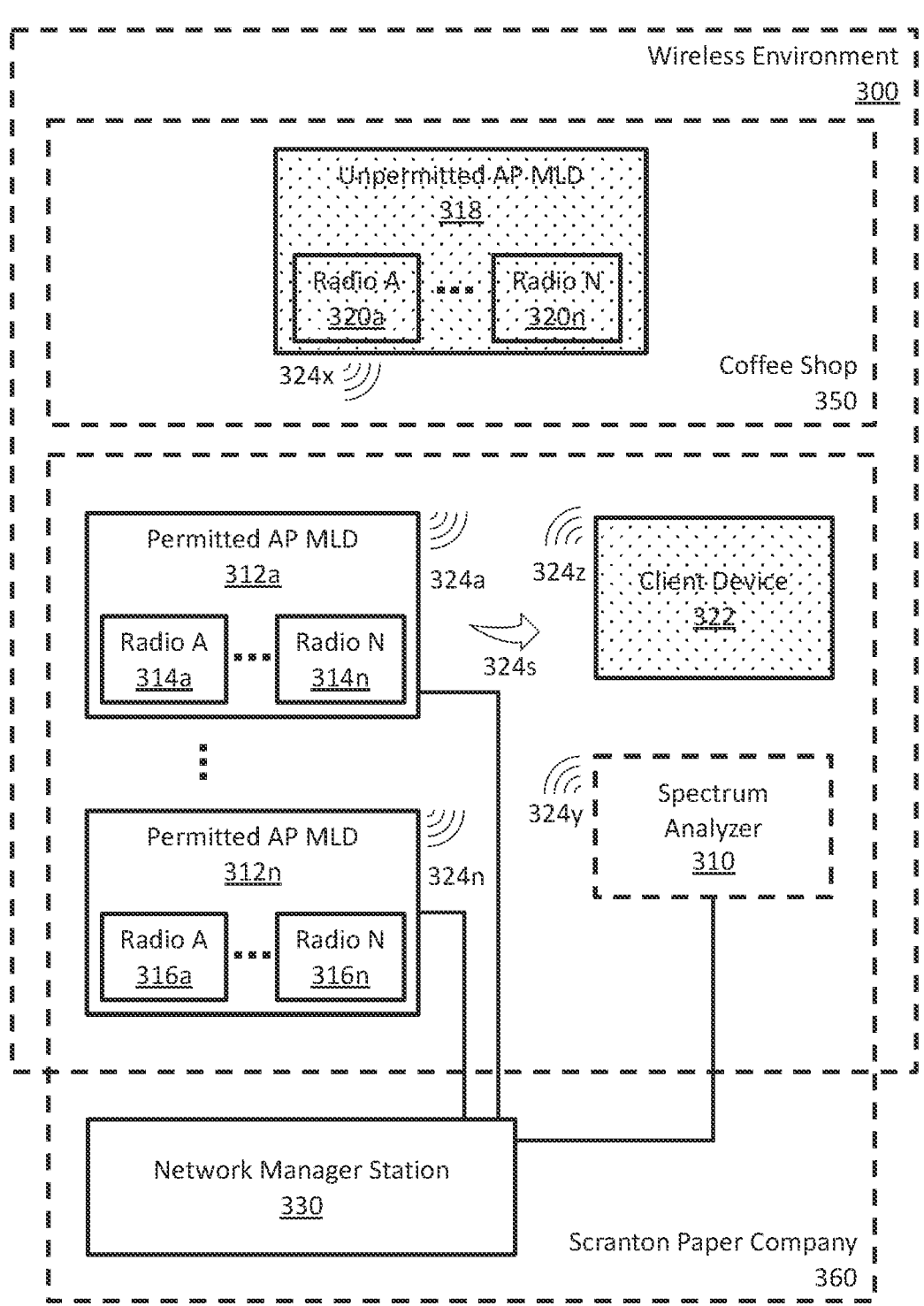
Figure 3C:
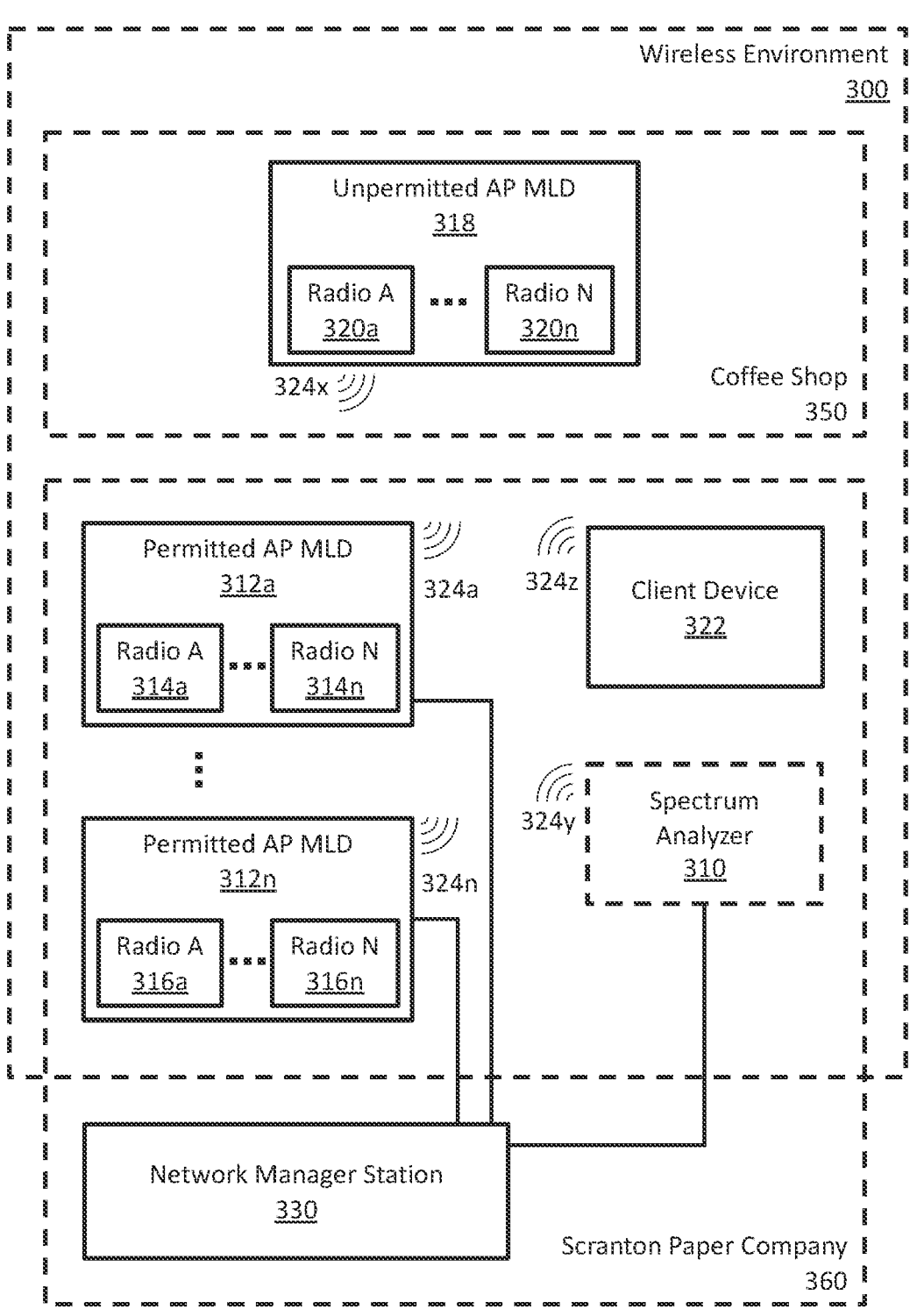
Figure 3D:
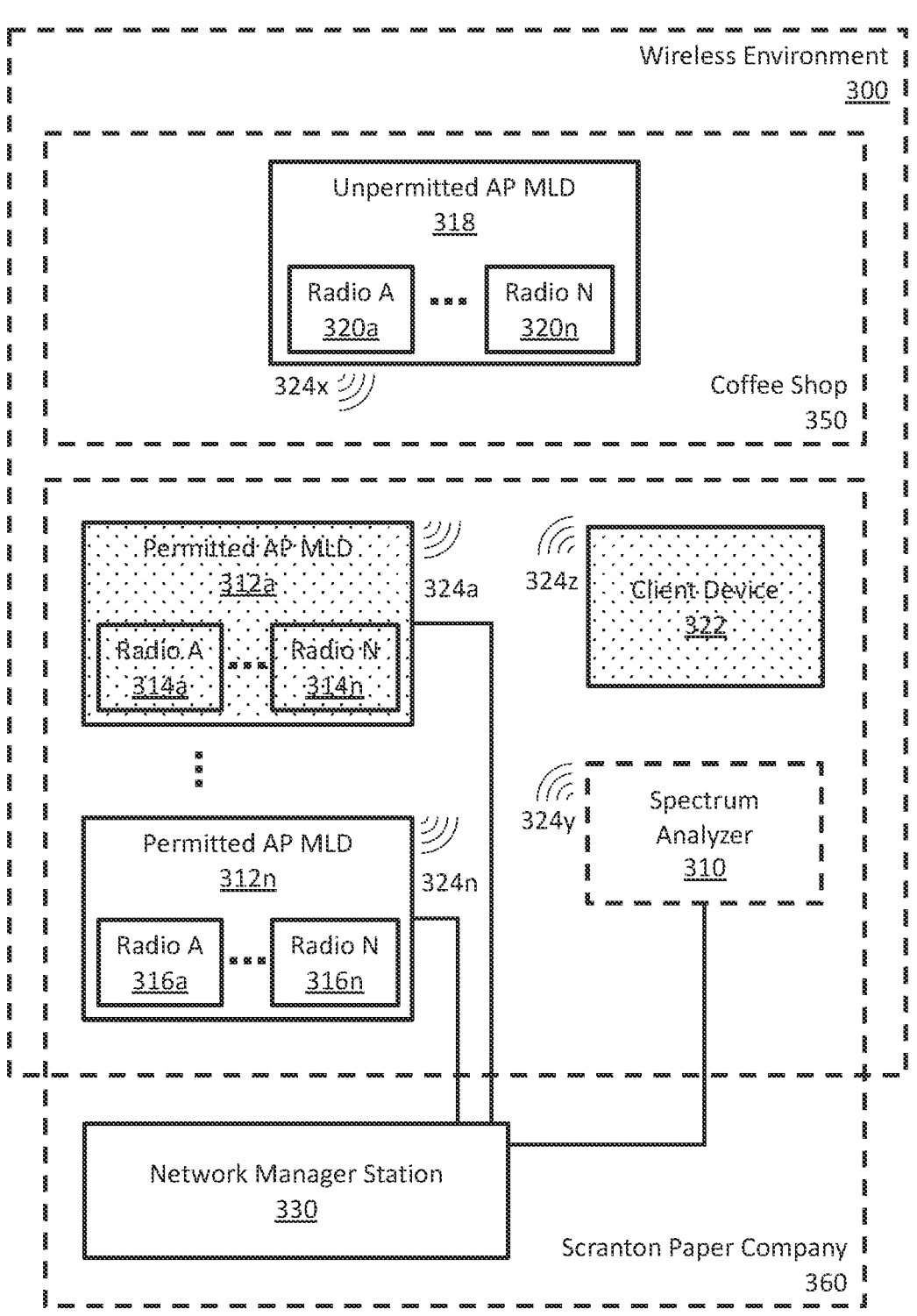

In FIG. 3A, a first wireless communication link has been established between the unpermitted AP MLD 318 and the client device 322. Note that the particular elements participating in a particular wireless communication link in each of FIGS. 3A, 3B, and 3D are shaded in the corresponding drawings. FIG. 3A may correspond, for example, to Operations 202 and 204 in which a prohibited first wireless communication link is detected. FIG. 3B may correspond, for example, to Operation 204 in which a frame is caused to be transmitted. FIG. 3C indicates, e.g., via the lack of shading of elements, that the first wireless communication link has been terminated by virtue of transmitting the frame. In FIG. 3D, a second wireless communication link is established between the permitted AP MLD 312a and the client device 322.

According to an aspect of the disclosure, transmission of the frame comprises sending, e.g., via or corresponding to a wireless communication signal 324a, management frame 324s, cf. Operation 206. Based on or after causing the transmission, one or more components for detecting wireless signals, e.g., spectrum analyzer 310 or network manager station 330, may obtain network information from or relating to the wireless environment 300. The network information may include link information. In certain embodiments, the one or more signal detection components may conduct monitoring operations, and/or receive, link information after the causing of or initiating transmission of the management frame 324s. The link information may indicate or specify, for example, whether or not the first wireless communication link between the unpermitted AP MLD 318 and the client device 322 has been terminated. In an example implementation, the indication or specification of whether or not the first wireless communication link has been terminated may comprise, for example, spectrum information and/or analysis signals generated by the spectrum analyzer 310 (e.g., based on spectrum-related information detected at the spectrum analyzer 310).

In one or more embodiments, the spectrum information and analysis signals generated by the spectrum analyzer 310 correspond to wireless communications between the unpermitted AP MLD 318 and the client device 322 (e.g., detected at and analyzed by the spectrum analyzer 310). For example, the spectrum analyzer 310 may detect and/or analyze particular spectrum information corresponding to first wireless signals 324x transmitted by the unpermitted AP MLD 318 within the wireless environment 108 and/or corresponding to second wireless signals 324z transmitted by client device 322 within the wireless environment 108. For instance, based on detecting and analyzing spectrum information corresponding to the first wireless signals 324x and/or the second wireless signals 324z, the spectrum analyzer 310 may generate and/or transmit, e.g., to the network manager station 330, analysis signals.

In example implementations, the analysis signals are transmitted from the spectrum analyzer 310 to one or more recipient components such as the network manager station 330, a connection detector of the network manager station 330 (cf. connection detector 132), and/or a connection evaluator of the network manager station 330 (cf. connection evaluator 134). Additionally or alternatively, the one or more recipient components may comprise, for example, the permitted AP MLD 312a and/or the permitted AP MLD 312n. The one or more recipient components may, in some embodiments, use the analysis signals to determine whether or not the first wireless communication link between the unpermitted AP MLD 318 and the client device 322 has been terminated.

In addition to or as an alternative to the one or more signal detection components monitoring for the link information (indicative of whether or not the first wireless communication link has been terminated), the one or more signal detection components and/or other components may monitor for and/or may receive other link information after the causing of or initiating transmission of the management frame 324s. The other link information may indicate or specify, for example, whether or not the client device 322 has received and/or has responded to the management frame 324s that was initiated or caused to be transmitted to the client device 322. In an example implementation, the indication or specification of whether or not the client device 322 has received and/or responded to the management frame 324s may comprise content generated by the spectrum analyzer 310 based on spectrum data (e.g., related to the second wireless signals 324z) detected at the spectrum analyzer 310.

Additionally or alternatively, the indication or specification of whether or not the client device 322 has received and/or responded to the management frame 324s may comprise a signal or message (e.g., related to the second wireless signals 324z and/or sent via a wired connection) from the client device 322 indicating that the client device 322 has received and/or responded to the management frame 324s. Responding to the management frame 324s, in one or more examples, may comprise a transmission from the client device 322 to the unpermitted AP MLD 318 of a particular signal or message. The particular signal or message sent or communicated to the unpermitted AP MLD 318 may indicate, and/or be determined (e.g., by the one or more other components) to indicate, to the unpermitted AP MLD 318 termination of the first wireless communication link. In typical embodiments, termination of the first wireless communication link comprises or results in the unpermitted AP MLD 318 disassociating with the client device 322. Additionally, or alternatively, termination of the first wireless communication link may comprise or result in a Basic Service Set (BSS) transition management (BTM) process indicating the unpermitted AP MLD 318 as not being an affiliated AP MLD for the client device 322.

In an example implementation, the particular signal or message may comprise or indicate a termination frame indicating termination of the first wireless communication link and/or that the client device 322 does not intend to and will not communicate further, e.g., will not associate with and/or form another wireless communication link, with the unpermitted AP MLD 318. Hence, the other link information may indicate or specify whether or not the client device 322 has sent a link-termination message (instructing that the first wireless communication link be terminated) to the unpermitted AP MLD 318 in response to the management frame 324*s*.

According to an aspect of the disclosure, one or more components at or corresponding to the second commercial entity, e.g., Scranton Paper Company 360, may determine whether causing or initiating transmission of the management frame 324*s* has been effective. For example, the network manager station 330, and/or in particular the connection evaluator of the network manager station 330, may determine whether causing or initiating transmission of the management frame 324*s* to the client device 322 has resulted in the first wireless communication link between the client device 322 and the unpermitted AP MLD 318 being terminated. If for example, one or more conditions are not detected, then an additional measure or measures may be implemented. The one or more conditions may include the first wireless communication link between the unpermitted AP MLD 318 and the client device 322 not being determined to have been terminated, e.g., based on the link information, and/or the client device 322 not having been determined to have responded to the management frame 324*s*, e.g., based on the other link information. In one or more embodiments, the additional measure or measures may be implemented if the one or more conditions have not been detected following a pre-set interval of time following transmission of the management frame 324*s*.

In an example embodiment, the pre-set interval of time is set by or corresponds to a disassociation timer stored and/or used by the network manager station 330. The one or more additional measures may include, for example, initiating one or more notifications, e.g., to the client device 322 and/or to the enterprise affiliated with the client device 322. The one or more notifications may indicate a BSS Termination corresponding to the first wireless communication link between the client device 322 and the unpermitted AP MLD 318 is being terminated. The notification may comprise, for example, one or more BSS Termination frames sent, for example, by the network manager station 330 and/or by the permitted AP MLD 312*a*.

5. HARDWARE OVERVIEW

According to one embodiment of the disclosure, the techniques described herein are implemented by one or more special-purpose computing devices. The special-purpose computing devices may be hard-wired to perform the techniques, or may include: (i) digital electronic devices such as one or more application-specific integrated circuits (ASICs), field programmable gate arrays (FPGAs), or network processing units (NPUs) that are persistently programmed to perform the techniques, or (ii) one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
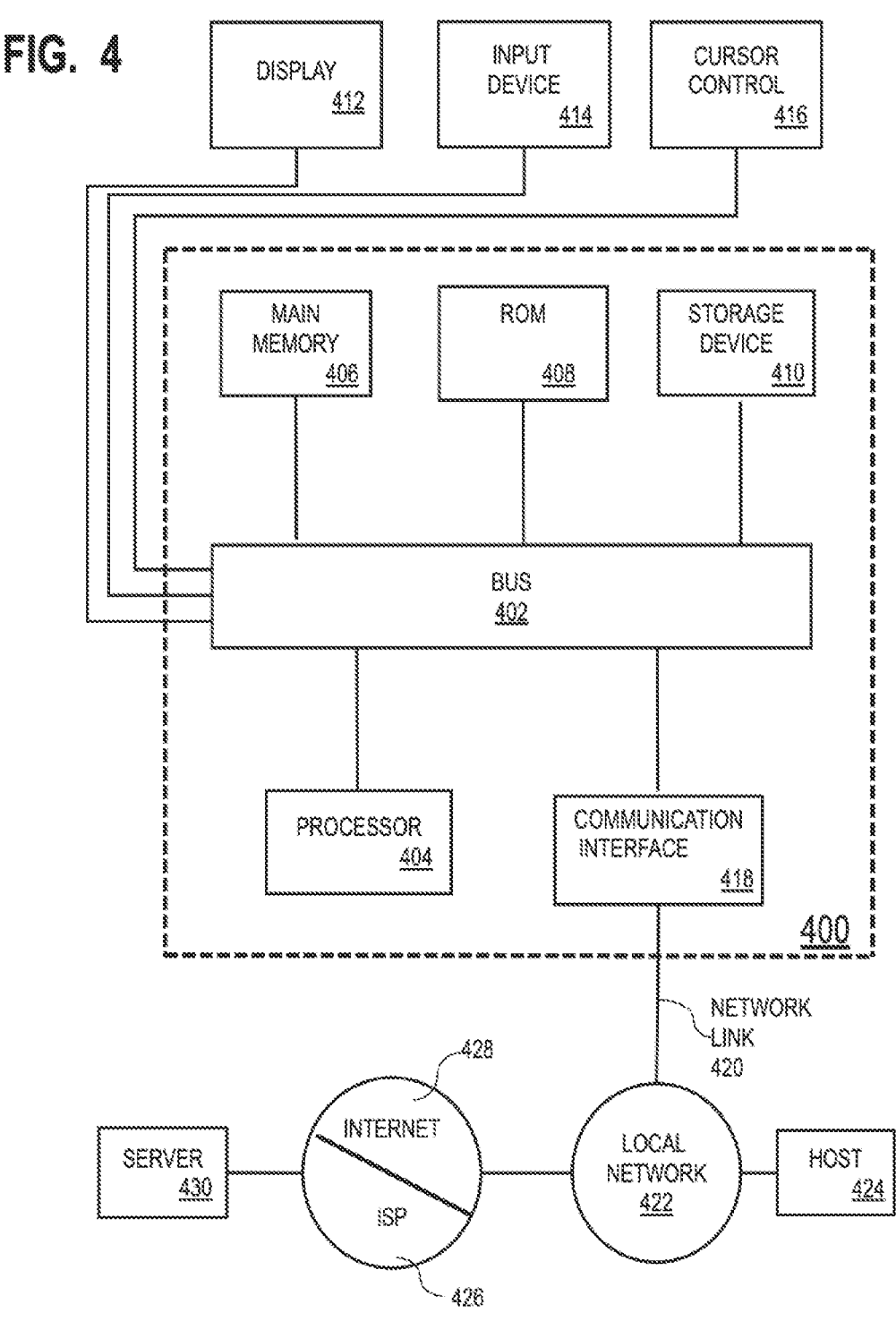
FIG. 4 illustrates a block diagram that includes a computer system in accordance with one or more embodiments of the disclosure.

For example, FIG. 4 is a block diagram illustrating the computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a memory 406, such as a random access memory (RAM) or other dynamic storage device, coupled to bus 402 for storing information and instructions to be executed by processor 404. Memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, flash drive, or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, an axis (e.g., x) and another axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment of the disclosure, the techniques herein are performed by computer system 400 in response to processor 404 executing one or more sequences of one or more instructions contained in memory 406. Such instructions may be read into memory 406 from another storage medium, such as storage device 410. Execution of the sequences of instructions contained in memory 406 causes processor 404 to perform the process operations described herein. In alternative embodiments of the disclosure, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks or flash drives, such as storage device 410. Volatile media includes dynamic memory, such as memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or radio waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to memory 406, from which processor 404 retrieves and executes the instructions. The instructions received by memory 406 may optionally be stored on storage device 410 either before or after execution by processor 404.

Computer system 400 also includes a communication interface 418 coupled to bus 402.

Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

Embodiments are directed to a computing system with one or more devices that include a hardware processor and that are configured to perform any of the operations described herein and/or recited in any of the claims below.

In an embodiment of the disclosure, one or more non-transitory computer readable storage media comprise instructions which, when executed by one or more hardware processors, cause performance of any of the operations described herein and/or recited in any of the claims.

Any combination of the features and functionalities described herein may be used in accordance with one or more embodiments of the disclosure. In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicant to be the scope of the disclosure, is the literal and equivalent scope of the set of claims that issue from this application, in the specific form in which such claims issue, including any subsequent correction.

What is claimed is:

1. One or more non-transitory media having instructions which, when executed by one or more processors, cause a plurality of operations, the operations comprising:
   upon determining that an access point multi-link device (AP MLD) prohibited from connecting to a client device is connected to the client device over a first wireless communication link:
   causing a communication from the AP MLD to be spoofed by transmitting, from a device different than the AP MLD, a frame comprising (a) a source identifier that identifies the AP MLD as a source device of the frame and (b) a reconfiguration multi-link element indicating that the first wireless communication link is no longer available,
   wherein the reconfiguration multi-link element comprises a value in a type subfield of a multi-link control field of the frame, and
   wherein the client device terminates the first wireless communication link in response to receiving the frame.

2. The one or more non-transitory media of claim 1, wherein the frame further comprises (c) a destination identifier that identifies the client device as a destination device.

3. The one or more non-transitory media of claim 1, wherein the operations further comprise determining that the first wireless communication link is impermissible, and wherein causing the communication from the AP MLD to be spoofed is further responsive to the determining that the first wireless communication link is impermissible.

4. The one or more non-transitory media of claim 1, wherein the reconfiguration multi-link element further indicates that a second wireless communication link, which connects the AP MLD and the client device, is no longer available.

5. The one or more non-transitory media of claim 1, wherein the first wireless communication link is one of a plurality of wireless communication links established between the client device and the AP MLD, wherein the frame indicates that each of the plurality of wireless communication links is no longer available, and wherein the client device terminates each of the plurality of wireless communication links in response to receiving the frame.

6. The one or more non-transitory media of claim 1, wherein the frame includes an unencrypted frame.

7. The one or more non-transitory media of claim 1, wherein the frame includes an unencrypted beacon frame.

8. The one or more non-transitory media of claim 1, wherein the frame includes an unencrypted probe response frame.

9. A system having one or more processors configured to facilitate a plurality of operations, the operations comprising:

determining that an access point multi-link device (AP MLD), prohibited from connecting to a client device, is connected to the client device over a first wireless communication link; and based on the determining, spoofing a communication from the AP MLD by causing transmission, from a device different than the AP MLD, of a frame comprising:

a source identifier indicating the AP MLD as a source device of the frame; and a reconfiguration multi-link element indicating that the first wireless communication link is no longer available, wherein the frame comprises a multi-link control field having a value indicative of the reconfiguration multi-link element, wherein the value is in a type subfield of the multi-link control field, and wherein the frame is configured to cause the client device to terminate the first wireless communication link.

10. The system of claim 9, wherein the frame further comprises a destination identifier configured to identify the client device as a destination device.

11. The system of claim 9, wherein spoofing the communication from the AP MLD is responsive further to a determination, by the one or more processors, that the first wireless communication link is impermissible.

12. The system of claim 9, wherein the first wireless communication link is one of a plurality of wireless communication links established between the client device and the AP MLD, and wherein the frame indicates termination of each of the plurality of wireless communication links.

13. The system of claim 12, wherein the frame includes an unencrypted frame, and wherein the client device terminates each of the plurality of wireless communication links in response to receiving the unencrypted frame.

14. A method, comprising:

in response to determining a prohibited wireless communication link between an access point multi-link device (AP MLD) and a client device, generating a frame comprising:

a source identifier and a reconfiguration multi-link element indicating that the AP MLD is a source device of the frame and that the prohibited wireless communication link is no longer available, wherein the reconfiguration multi-link element comprises a value in a multi-link control field of the frame and wherein the value is in a type subfield of the multi-link control field of the frame; and causing the frame to be transmitted from a device different than the AP MLD, wherein the transmitting causes the client device to terminate the prohibited wireless communication link.

15. The method of claim 14, further comprising determining that the prohibited wireless communication link is impermissible.

16. The method of claim 15, wherein determining that the prohibited wireless communication link is impermissible is based on stored information indicating the AP MLD is an unauthorized AP MLD, and wherein the frame includes a destination identifier that identifies the client device as a destination device.

17. The method of claim 14, wherein: the prohibited wireless communication link is one of a plurality of wireless communication links established between the client device and the AP MLD; the frame indicates that each of the plurality of wireless communication links is no longer available; and the client device terminates each of the plurality of wireless communication links in response to receiving the frame.

\* \* \* \* \*